United States Patent Office 3,639,620
Patented Feb. 1, 1972

3,639,620
INSECTICIDAL COMPOSITION AND A METHOD OF USE COMPRISING CYANOALKYLTHIO OXIME CARBAMATES
Cyril Donninger, Sittingbourne, John H. Davies, Faversham, and Royston H. Davis, Rainham, England, assignors to Shell Oil Company, New York, N.Y.
No Drawing. Application July 23, 1968, Ser. No. 746,750, now Patent No. 3,522,287, dated Dec. 29, 1969, which is a continuation-in-part of application Ser. No. 591,986, Nov. 4, 1966. Divided and this application Feb. 13, 1970, Ser. No. 14,894
Claims priority, application Great Britain, Nov. 10, 1965, 47,675/65
Int. Cl. A01n 9/12
U.S. Cl. 424—304                    2 Claims

ABSTRACT OF THE DISCLOSURE

Cyanoalkylthio oxime carbamates, such as 1-cyanomethylthioacetaldoxime N-methyl carbamate, having insecticidal activity, are described.

This is a division of application Ser. No. 746,750, filed July 23, 1968, now U.S. Pat. 3,522,287 issued Dec. 29, 1969 which is a continuation-in-part of copending Ser. No. 591,986, filed Nov. 4, 1966, now abandoned.

BACKGROUND OF THE INVENTION

Field of the invention

This invention relates to novel cyanoalkylthio oxime carbamates.

Description of the prior art

Certain of the oxime carbamate described in Belgium Pat. 674,792, and in the above Ser. No. 591,986, have proven to be potent general insecticides. 1-methylthioacetaldoxime N-methyl carbamate, for example, has been shown to be highly effective against many foliage insects. Its usefulness for this purpose, however, is limited by the fact that it is quite phytotoxic, especially to cotton plants. Also its insecticidal activity againts some insects such as mites has been generally quite low.

SUMMARY OF THE INVENTION

It has now been found that the 1-cyanoalkylthio oxime carbamates of the above Ser. No. 591,986 are not only highly active broad spectrum insecticides, but in addition, are especially active toward mites and appear to be much less phytotoxic than their unsubstituted alkyl counterparts. This lack of phyotoxically makes them especially attractive foliage and soil insecticides.

Accordingly, this invention is a new class of cyanoalkylthio oxime carbamate, their use as insecticides and insecticidal formulations containing them.

DESCRIPTION OF THE PREFERRED EMBODIMENTS

The novel compounds of this invention can be described by the general formula

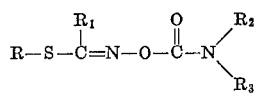

wherein R is a cyanoalkyl in which the alkyl moiety is of 1–5 carbon atoms, $R_1$ is alkyl of 1–5 carbon atoms, and $R_2$ and $R_3$, which may be the same or different, are hydrogen or alkyl of 1–3 carbon atoms.

It is well known that oximes can exist in two sterolsomeric forms known as "syn" and "anti" forms, and this same type of steroisomerism exists in the oxime carbamates of the present invention. Both stereoisomeric forms of the oxime carbamates, together with mixtures of the two forms, fall within the scope of the present invention.

The alkyl moiety of the cyanoalkyl group can be of straight or of branched-chain configuration. The cyano substituent may be attached to any carbon atom of the alkyl moiety.

Suitable R groups include cyanomethyl, 1-cyanoethyl, 2-cyanoethyl, 3-cyanopropyl, 2-cyanopropyl, 1-cyanopropyl, 1-cyano-1-methylethyl, 4-cyanobutyl, 2-methyl-3-cyanopropyl, 5-cyanopentyl, 2,2-dimethyl-3-cyanopropyl and the like.

The alkyl moiety represented by $R_1$ can be of straight of branched-chain configuration and includes such species as methyl, ehthly, isopropyl, butyl, tert-butyl, 3-methylbutyl pentyl and the like.

When $R_2$ or $R_3$ or both are alkyl, they include methyl, ethyl, propyl and isopropyl.

Representative species of the compound of this invention are:

1-cyanomethylthioacetaldoxime carbamate,
1-cyanomethylthioacetaldoxime N-methyl carbamate,
1-cyanomethylthiopropionaldoxime N,N-diethyl carbamate,
1-cyanomethylthiobutyraldoxime N-methyl-N-propyl carbamate,
1-cyanomethylthioisobutyraldoxime N-methyl carbamate,
1-cyanomethylthiocarproaldoxime N-methyl carbamate,
1-(2-cyanoethylthio)acetaldoxime carbamate,
1-(2-cyanoethylthio)acetaldoxime N-methyl carbamate,
1-(2-cyanoethylthio)valeraldoxime N-ethyl carbamate,
1-(1-cyanoethlthio)acetaldoxime N-methyl carbamate,
1-(3-cyanopropylthio)acetaldoxime N-methyl carbamate,
1(2-cyanopropylthio)acetaldoxime N-methyl carbamate,
1-(2-cyanopropylthio)caproldoxime N-methyl carbamate,
1-(2-cyano-1-methylethylthio)propionaldoxime N-methyl carbamate,
1-(4-cyanobutylthio)acetaldoxime N-methyl carbamate,
1-(4-cyanobutylthio)isovaleraldoxime N-propyl carbamates,
1-(2-cyanobutylthio)propionaldoxime N-methyl carbamate,
1-(1-(cyanomethyl)propylthio)acetaldoxime N-methyl carbamate,
1-(5-cyanopentylthio)acetaldoxime N-methyl carbamate,
1-(3-cyanopentylthio)butraldoxime N-methyl carbamate,
1-(1,1-dimethyl-3-cyanopropylthio)acetaldoxime N-methyl carbamate, and the like.

Within the cyanoalkylthio oxime carbamates of Formula I, it appears that those having the highest insecticidal activity are those of the subclass where R is cyanoalkyl in which the alkyl moiety is of 1–3 carbon atoms, preferably cyanomethyl, 2-cyanoethyl or 3-cyanopropyl, $R_1$ is alkyl of 1–3 carbon atoms, preferably methyl, $R_2$ is hydrogen and $R_3$ is alkyl of 1–3 carbon atoms, preferably methyl.

The preferred species within this subclass are:

1-cyanomethylthioacetaldoxime N-methyl carbamate,
1-(2-cyanoethylthio)acetaldoxime N-methyl carbamate,
1-(3-cyanopropylthio)acetaldoxime N-methyl carbamate.

PREPARATION

The novel oxime carbamate of the present invention may be prepared by reacting the appropriate 1-cyanoalkylthio aldoxime of the formula

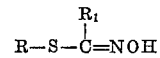

with phosgene and the appropriate substituted amine of the formula NHR$_2$R$_3$, (includes NH$_3$) or alternatively with an isocyanate of the formula R$_3$NCO or a carbamoyl chloride of the formula (III)

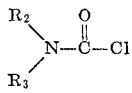

optionally in the presence of a base, preferably an organic base such as a trialkylamine. R, R$_1$, R$_2$ and R$_3$ in all these formulae have the meanings as defined above in respect to Formula I. The isocyanate or carbamoyl chloride-type reaction is preferably carried out in the presence of a liquid organic reaction medium such as methylene chloride or benzene, but the phosgene-type reaction can be carried out in an aqueous system.

The 1-cyanoalkylthio aldoximes of Formula II above may be prepared by reacting the appropriate 1-halo-oxime with the appropriate mercaptan in an organic reaction medium such as ethanol or ether. The oximes may also be prepared by the published method (Chem. Bull. Pharm. Japan 1966, 14, 1249) of reacting the appropriate halo-aldoxime with sodium and hydrogen sulfide to form the sodium salt of the thiohydroxamic acid, and then reacting this sodium salt with the appropriate halo nitrile.

The compounds of this invention are effective against a broad spectrum of insects. By the term insect is meant not only those members of the class Insecta, but also related or similar non-vertebrate animal organisms belonging to the allied classes of arthropods and including mites, ticks, spiders, wood lice and the like.

The compounds of this invention may be used in the form of insecticidal compositions. The insecticidal compositions contain the conventional inert carriers, i.e., the liquid or solid agents normally associated with insecticides. The insecticidal compositions may also include surface active agents.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the materials usually applied in formulating insecticides may be used as carrier.

Examples of suitable solid carriers are silicates, clays, for example. kaolinite clay, synthetic hydrated silicon oxides, synthetic calcium silicates, elements such as for example, carbon and sulfur, natural and synthetic resins such as for example, coumarone resins, rosin, copal, shellac, dammar, polyvinyl chloride and styrene polymers and copolymers, solid polychlorophenols, bitumen, asphaltite, waxes such as for example, beeswax, paraffin wax, montan wax and chlorinated mineral waxes, and solid fertilizers for example, superphosphates.

Examples of suitable fluid carriers are water, alcohols, such as for example, isopropanol, ketones such as for example acetone, methyl ethyl ketone, methyl isobutyl ketone and cyclohexanone, ethers, aromatic hydrocarbons such as for example, benzene and toluene, petroleum fractions such as for example, kerosene, chlorinated hydrocarbons, such as for example, carbon tetrachloride, including liquefied normally vaporous gaseous compounds. Mixtures of different liquids are often suitable.

The surface-active agent may be a wetting agent, an emulsifying agent or a dispersing agent; it may be non-ionic or ionic. Any of the surface-active agents usually applied in formulating insecticides may be used. Examples of suitable surface-active agents are the sodium or calcium salts of polyacrylic acids, the condensation products of fatty acids or aliphatic amines or amides containing at least 12 carbon atoms in the molecule with ethylene oxide and/or propylene oxide; partial esters of the above fatty acids with glycerol, sorbitan, sucrose or pentaerythritol; condensation products of alkyl phenols, for example p-octylphenol or n-octylcresol, with ethylene oxide and/or propylene oxide; sulfates or sulfonates of these condensation products; and alkali metal salts preferably sodium salts, or sulfuric acid esters or sulfonic acids containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The compositions of the invention may be formulated as wettable powders, dusts, granules, solutions, emulsifiable concentrates, emulsions and pastes. Wettable powders are usually compounded to contain 25, 50 or 75% of toxicant and usually contain, in addition to solid carrier, 3–10% of a dispersing agent and, where necessary, 0–10% of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% of toxicant. Granules are usually prepared to have a size between 10 and 100 BS mesh, and may be manufactured by agglomeration or impregnation techniques. Generally, granules will contain ½–25% toxicant and 0–25% of additives such as stabilizers, slow release modifiers, binding agents, etc. Emulsifiable concentrates usually contain, in addition to the solvent and, when necessary co-solvent, 10–50% w./v. toxicant, 2–20% w./v. emulsifiers and 0–20% of appropriate additives such as stabilizers, penetrants an corrosion inhibitors. Pastes are compounded so as to obtain a stable, flowable product and usually contain 10–60% toxicant, 2–20% of appropriate additives and, as carrier, water or an organic liquid in which the toxicant is substantially insoluble.

The compositions of the invention may contain other ingredients, for example, protective colloids such as gelatin, glue, casein, gums and polyvinyl alcohol; sodium polyphosphates; cellulose ethers, stabilizers such as ethylene diamine tetra-acetic acid; other pesticides; and stickers, for example, non-volatile oils.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The amount of the 1-cyanoalkylthio oxime carbamate necessary to control or kill the insects is defined as the insecticidal amount. This quantity will obviously vary with the species of oxime carbamate, the particular insect, type of formulation, environmental conditions, etc. Those versed in the insecticidal field, however, can readily determine the optimum amount for any particular situation.

The inesticidal composition will usually contain from about 0.5–75% or more by weight of the oxime carbamate, based upon the total weight of the oxime carbamate and carrier.

The preparation of the novel compounds of the invention and their insecticidal activity are illustrated in the following examples. All the elemental analyses are based upon percent by weight.

EXAMPLE I

Preparation of 1-(2-cyanoethylthio)acetaldoxime N-methyl carbamate

Triethylamine (16.8 g.) was added to a stirred solution of 1-chloroacetaldoxime (15.5 g.) in ether at −10° C. To this solution was added 3-mercaptopropionitrile (14.4 g.) at −10° C. and the solution stirred and allowed to warm up to room temperature. Water and dichloromethane were added, the organic layer was separated, dried and evaporated to give the crude oxime, which after recrystallization from benzene, had a melting point 82–84° C.

*Analysis.*—Calculated for $C_5H_6N_2SO$ (percent): C, 41.6; H, 5.6; N, 19.4; S, 22.2. Found (percent): C, 41.6; H, 5.8; N, 19.3; S, 22.7.

The above oxime (2.1 g.) was dissolved in dichloromethan (100 mls.), and one drop of triethylamine and methylisocyanate (4 mls.) were added. The reaction was boiled under reflux for 1 hour, and then evaporated to dryness to yield a product which, on recrystallization from benzene/60–80 petrol yielded 1-(2-cyanoethylthio)acetaldoxime N-methyl carbamate, M.P. 83–84° C.

*Analysis.*—Calculated for $C_7H_{11}N_3SO_2$ (percent): C, 41.8; H, 5.5; S, 15.9. Found (percent): C, 42.1; H, 5.5; S, 15.9.

EXAMPLE II

Preparation of 1-(3-cyanopropylthio)acetaldoxime N-methyl carbamate

Sodium (4.6 g.) was dissolved in methanol (150 mls.), and hydrogen sulfide was passed onto the resulting solution at 0° C. for 1 hour. A solution containing 1-chloroacetaldoxime (9.3 g.) in ether (100 mls.) was added dropwise and the mixture stirred for 2 hours. The solution was then evaporated to a thick slurry, washed with ether (3× 100 mls.), and evaporated to dryness after decanting off the ether.

The resultant solid was dissolved in water (150 mls.), and acidified to pH 6 with concentrated hydrochloric acid. The reaction mixture was then extracted with ether (2× 200 mls.), dried over magnesium sulfate and evaporated to dryness to yield an oil. This oil was then dissolved in ether (35.5 mls.), and to this solution methylamine (5.0 mls.), followed by 4-bromobutyronitrile, was added dropwise with cooling. The mixture was stirred for 15 minutes, acetone (30 mls.) was added to break-up the triethylamine hydrochloride, and the product filtered and evaporated to dryness to yield 1-(3-cyanopropylthio)acetaldoxime M.P. 94–95° C.

*Analysis.*—Calculated for $C_6H_{10}N_2SO$ (percent): C, 45.5; H, 6.6; N, 17.7; S, 20.3. Found (percent): C, 46.2; H, 6.6; N, 17.4; S, 19.9.

The above oxime was dissolved in dichloromethane (70 mls.) and 1 drop of triethylamine and methylisocyanate (3.5 mls.) was added. The mixture was refluxed for 2 hours and then evaporated to low volume to yield an oil, which was purified by chromatography on a silica gel column using 60% dichloromethane/40% ether as eluant. 1-(3-cyanopropylthio)acetaldoxime N-methyl carbamate was then obtained, M.P. 43–45° C.

*Analysis.*—Calculated for $C_6H_{13}N_3SO_2$ (percent): C, 44.6; H, 6.1; S, 14.9. Found (percent): C, 44.4; H, 6.1; S, 15.2.

EXAMPLE III

Preparation of 1-cyanomethtylthiopropionaldoxime N-methyl carbamate

Sodium (9.2 g.) was dissolved in methanol (200 mls.) and hydrogen sulfide bubbled-in for two hours. To the resultant sodium hydrogen sulfide solution there was added dropwise an ethereal solution containg chloropropionaldoxime (21.5 g.), and the mixture then stirred for a further hour. The ether solvent was then removed, the resultant solid dissolved in water (220 mls.), and the aqueous solution acidified with concentrated hydrochloric acid to pH 1. The cloudy solution was then extracted twice with ether (100 mls.), the ether extract dried over magnesium sulfate, and then evaporated to yield an oil. This oil was dissolved in ether (100 mls.) and triethylamine (6.1 g.) added. The resulting suspension was vigorously stirred and chloroacetonitrile (4.6 g.) added dropwise. The resulting crystalline solid was filtered off and chromatographically purified on a silica gel column using dichloromethane as eluent to yield 1-cyanomethylthiopropionaldoxime, M.P. 126–127° C.

*Analysis.*—Calculated for $C_5H_6N_2SO$ (percent): C, 41.7; H, 5.6; N, 19.4; S, 22.2. Found (percent): C, 42.1; H, 5.7; N, 19.4; S, 22.5.

The oxime prepared as described above (3 g.) was dissolved in dry doxan (50 mls.), and to this solution there was added methylisocyanate (2.5 mls.) and one drop of triethylamine. The reaction mixture was then left to stand at room temperature for 24 hours, and the solvent then removed to yield an oil. The oil was purified chromatographically on a silica gel column using dichloromethane/ether 10/1 as eluent. The resulting product was then recrystallized from benzene to yield 1-cyanomethylthiopropionaldoxime N-methyl carbamate, M.P. 77–78° C.

*Analysis.*—Calculated for $C_7H_{11}N_3SO_2$ (percent): C, 41.8; H, 5.5; N, 20.9; S, 15.9. Found (percent): C, 41.7; H, 5.6; S, 16.2.

Using the procedures of Examples I–III the following 1-cyanoalkylthio oxime carbamates were prepared. The results are summarized in Table I. The compounds are identified by the following formula

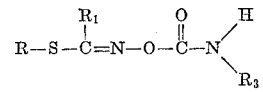

TABLE I

| Example No. | R | $R_1$ | $R_3$ | Melting point (° C.) | Element | Calcd. | Found |
|---|---|---|---|---|---|---|---|
| IV | —$CH_2CN$ | —$CH_3$ | —$CH_3$ | 100–101.5 | C | 38.5 | 38.2 |
| | | | | | H | 4.8 | 4.4 |
| | | | | | N | 22.5 | 22.8 |
| | | | | | S | 17.1 | 17.3 |
| V | —$CH_2CH_2CN$ | —$CH_3$ | —$C_2H_5$ | 70–71 | C | 44.6 | 44.6 |
| | | | | | H | 6.1 | 6.1 |
| | | | | | S | 14.9 | 14.8 |
| VI | —$CH_2CH_2CN$ | —$C_2H_5$ | —$CH_3$ | 73–74 | C | 44.6 | 44.7 |
| | | | | | H | 6.1 | 6.1 |
| | | | | | S | 14.9 | 15.0 |
| VII | —$CH_2(CH_2)_3CN$ | —$CH(CH_3)_2$ | —$CH_3$ | 51–52 | | | |
| VIII | —$CH_2(CH_2)_2CN$ | —$C_2H_5$ | $CH_3$ | 54–55 | C | 47.1 | 47.1 |
| | | | | | H | 6.6 | 8.8 |
| | | | | | N | 18.5 | 17.8 |

EXAMPLE IX

Insetlcidal activity

The insecticidal activity of the compounds obtained in the provious examples was tested as follows:

(I) A 1.0% by weight solution in acetone of the compound to be tested was prepared, and taken up in a micrometer syringe. Two to three-day old adult female house flies (*Musca domestica*) (M.d.) were anaesthetized with carbon dioxide, and a 1 μl. drop of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

(II) A quantity of 0.1 ml. of a 1.0% by weight solution of the compound to be tested in acetone was mixed in a beaker with 100 ml. of water. Twenty 5–6 day-old (4th instar) mosquito larvae (*Aedes aegypti*) (A.a.) were added and the beakers stored for 24 hours. The percentage of dead and moribund larvae was then recorded.

(III) The compounds were formulated as solutions or suspensions in water containing 20% by weight of acetone and 0.05% by weight of Triton X 100 as wetting agent. The formulations contained 0.7% by weight of the compound to be tested. Turnip and broad bean plants, trimmed to one leaf each, were sprayed on the under surface of the leaf with the above formulation. Spraying was effected with a spraying machine delivering 40 gallons per acre, the plants passing under the spray on a moving belt. The 4th instar (8-day-old) diamond-back moth larvae (*Plutella maculipennis*) (P.m.) ten apterous (6-day-old) vetch aphids (*Megoura viciae*) (M.v.), and ten adult 1–2 week-old mustard beetles (*Phaedon cochleariae*) (P.c.) respectively were placed on the sprayed leaves and each plant then enclosed in a glass cylinder fitted at one end with a muslin cap. Mortality counts were made after 24 hours.

(IV) In tests against glass house red spider mites (*Tetranychus telarius*) (T.t.), leaf discs cut from French bean plants were sprayed in the manner described under III. 1 hour after spraying, the discs were inoculated with 10 adult mites. Mortality counts were made 24 hours after inoculation.

(V) In tests against large white butterfly larvae (*Pieris brassicae*) (P.b.), cabbage leaves were sprayed in the manner described undre III. 10 3rd instar (8–10 day-old) larvae were placed on discs cut from the sprayed leaves within perti-dish pairs. Mortality counts were made 24 hours after inoculation.

The results of the above tests are summarized in the following Table II, where A denotes 100% kill, B some kill and C no kill of the test insects.

TABLE II

| Test compound [1] | Insecticidal activity | | | | | | |
|---|---|---|---|---|---|---|---|
| | M.d. | A.a. | P.c. | P.m. | P.b. | M.v. | T.t. |
| I | A | A | A | C | A | A | A |
| II | B | C | C | C | A | A | A |
| III | A | A | A | A | A | A | A |
| IV | A | A | B | B | A | A | A |
| V | B | B | B | C | B | A | A |
| VI | A | A | B | B | A | A | A |
| VII | C | C | C | C | A | C | A |
| VIII | C | C | C | C | B | A | A |

[1] Roman numerals refer to oxime carbamates prepared in respective examples.

We claim as our invention:

1. An insecticidal composition comprising an insecticidal amount of a compound of the formula

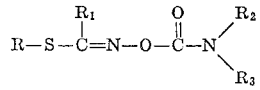

wherein R is cyanoalkyl in which the alkyl moiety is of 1–5 carbons, $R_1$ is alkyl of 1–5 carbons, and $R_2$ and $R_3$, which may be the same or different, are hydrogen or alkyl of 1–3 carbons and a carrier.

2. A method of controlling insects comprisnig contacting said insects with an insecticidal amount of a compound of the formula

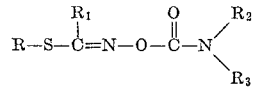

wherein R is cyanoalkyl in which the alkyl moiety is of 1–5 carbons, $R_1$ is alkyl of 1–5 carbons, and $R_2$ and $R_3$ which may be the same or different, are hydrogen or alkyl of 1–3 carbons.

References Cited

UNITED STATES PATENTS 3,414,652   12/1968   Buchanan _____ 424—218

ALBERT T. MEYERS, Primary Examiner

A. J. ROBINSON, Assistant Examiner